United States Patent
Panje et al.

(10) Patent No.: US 11,350,352 B2
(45) Date of Patent: May 31, 2022

(54) SYSTEM AND METHOD FOR HANDLING NON-ASSOCIATED STATION LIST

(71) Applicant: ARRIS Enterprises LLC, Suwanee, GA (US)

(72) Inventors: Krishna Prasad Panje, Bengaluru (IN); Anil Kumar Nellore, Bengaluru (IN)

(73) Assignee: ARRIS ENTERPRISES LLC, Suwanee, GA (US)

(*) Notice: Subject to any disclaimer, the term of this patent is extended or adjusted under 35 U.S.C. 154(b) by 0 days.

(21) Appl. No.: 16/923,473

(22) Filed: Jul. 8, 2020

(65) Prior Publication Data

US 2021/0014775 A1   Jan. 14, 2021

Related U.S. Application Data

(60) Provisional application No. 62/871,698, filed on Jul. 8, 2019.

(51) Int. Cl.
| | |
|---|---|
| *H04W 48/16* | (2009.01) |
| *H04W 48/08* | (2009.01) |
| *H04W 84/12* | (2009.01) |
| *H04W 88/16* | (2009.01) |

(52) U.S. Cl.
CPC ......... *H04W 48/16* (2013.01); *H04W 48/08* (2013.01); *H04W 84/12* (2013.01); *H04W 88/16* (2013.01)

(58) Field of Classification Search
CPC ..... H04W 84/12; H04W 40/12; H04B 17/318
See application file for complete search history.

(56) References Cited

U.S. PATENT DOCUMENTS

| | | | |
|---|---|---|---|
| 2007/0025371 A1* | 2/2007 | Krantz | H04L 12/5692 370/329 |
| 2008/0320108 A1* | 12/2008 | Murty | H04W 48/20 709/220 |
| 2009/0029728 A1* | 1/2009 | Shen | H04W 48/14 455/507 |
| 2019/0075469 A1* | 3/2019 | Mahoney | H04W 16/12 |
| 2020/0322039 A1* | 10/2020 | Dong | H04W 48/20 |

* cited by examiner

*Primary Examiner* — Fabricio R Murillo Garcia
(74) *Attorney, Agent, or Firm* — Wenderoth, Lind & Ponack, L.L.P.

(57) ABSTRACT

A gateway for use with a client device and a number n access points. The gateway includes a data communication component that can communicate with each of the n access points, and an AP/C management component that can generate a NAC report request, generate an issue request, and generate a steering instruction. The data communication component can further transmit the NAC report request to the n access points. The data communication component can further transmit the issue request to the client device. The AP/C management component can generate the steering instruction based on n non-associated NAC reports. The data communication component can further transmit the steering instruction to the client device.

20 Claims, 15 Drawing Sheets

SYSTEM AND METHOD FOR HANDLING NON-ASSOCIATED STATION LIST

BACKGROUND

Embodiments of the invention relate to steering clients from one access point (AP) to another AP within a local area network (LAN).

SUMMARY

Aspects of the present invention are drawn to a gateway for use with a client device and a number n access points. The client device can communicate with a number m access points, $1 \leq m \leq n$. Each of the n access points can communicate with the gateway. The client device can further transmit a probe request to the m access points. Each of the n access points can further transmit a respective non-associated client (NAC) report. The gateway includes a data communication component that can communicate with each of the n access points, and an AP/C management component that can generate a NAC report request, generate an issue request, and generate a steering instruction. The data communication component can further transmit the NAC report request to the n access points. The data communication component can further transmit the issue request to the client device. The AP/C management component can generate the steering instruction based on the n non-associated NAC reports. The data communication component can further transmit the steering instruction to the client device.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

A prior art system for steering a client to an access point (AP) within a local area network (LAN) will now be described in greater detail with reference to FIGS. 1-5.

Figure 1:
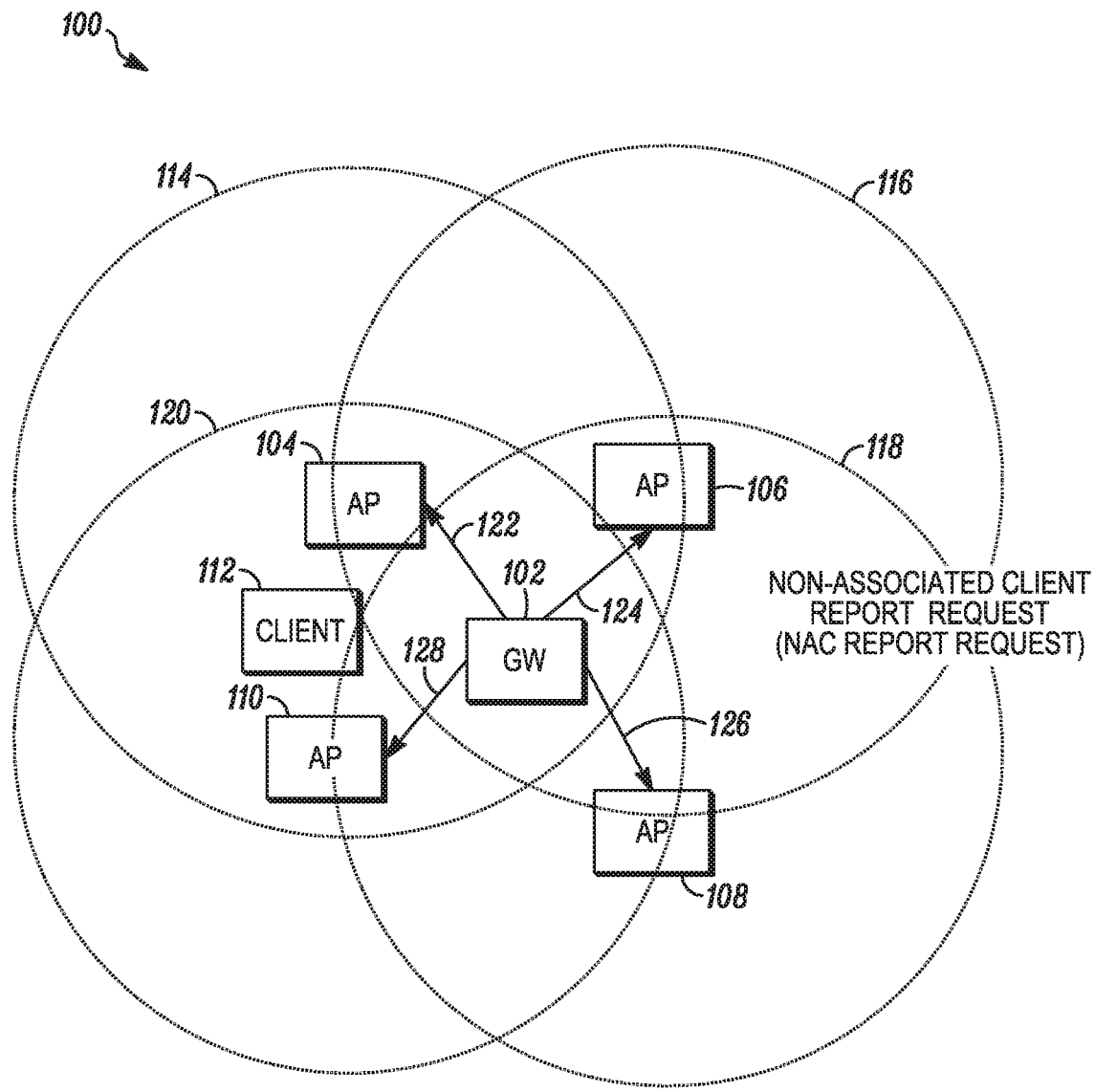
FIG. 1 illustrates a prior art local area network (LAN) at a time $t_1$.

FIG. 1 illustrates a prior art LAN 100 at a time $t_1$, wherein non-associated client (NAC) report requests are sent from a gateway to APs.

As shown in the figure, LAN 100 includes a gateway 102, an AP 104, an AP 106, an AP 108, an AP 110 and a client 112.

Gateway 102 may be any device or system that is operable to allow data to flow from one discrete network to another, e.g., from network 100 in the figure to the Internet (not shown). Gateway 102 may perform such functions as link layer and physical layer outroute coding and modulation (e.g., DVB S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing.

Network 100 generally employs a layered protocol (e.g., make use of what are sometimes called protocol stacks or layered protocols (e.g., the Open Systems Interconnection (OSI) model). Networks generally employ such layered network protocols to accommodate a vast diversity of systems and physical devices (e.g., diverse platforms, such as computers running various operating systems, smart phones, entertainment systems, etc., and diverse forms of physical connection such as various types of wired connections, wireless connections, fiber optics, etc.). In a layered protocol, each layer is responsible for a particular kind of functionality, and each layer depends on the layers below it for other functions and provides services to the layers above it. In accordance with such a layered system, a given service can be used by multiple versions of the layer above it, and can make use of multiple versions of the layer below it. For example, in view of current large and complex systems that are constantly being updated, the layered protocol provides for the ability to change the implementation of a service without affecting other components of the system, and also different services can be implemented at each layer and can be modified or replaced without affecting the services of the other layers.

Each of AP 104, AP 106, AP 108 and AP 110 may be any device or system that is able to provide client 112 to access gateway 102. Conventionally, an AP usually connects to gateway as a standalone device, but it can also be an integral component of the gateway itself.

In this example, each AP wirelessly communicates with devices via a pre-assigned channel within the Wi-Fi protocols.

Conventionally, a client is associated to an AP in a multi AP local area network (LAN). However, the client may be in the serviceable vicinity of (thus be available to) other APs within the LAN. Such a client is classified as non-associated client with respect to AP(s) that are not servicing that client.

For purposes of discussion only, each of AP 104, AP 106, AP 108 and AP 110 is wirelessly connected to gateway 102, e.g., via Wi-Fi under IEEE 802.11 protocols. As shown in the figure: AP 104 is able to wirelessly communicate via Wi-Fi to other devices within a wireless communication area 114; AP 106 is able to wirelessly communicate via Wi-Fi to other devices within a wireless communication area 116; AP 108 is able to wirelessly communicate via Wi-Fi to other devices within a wireless communication area 118; and AP 104 is able to wirelessly communicate via Wi-Fi to other devices within a wireless communication area 120.

Accordingly, at time $t_1$ in the figure, client 112 is located within the wireless communication areas for each of each of AP 104, AP 106, AP 108 and AP 110. As such, client 112 is able to communicate with each AP 104, AP 106, AP 108 and AP 110. However, in practice client 112 is only able to connect to one AP at a time. Once connected, client 112 is said to be associated with that particular AP. The other remaining APs are said to be Non-Associated with client 112.

For example, for purposes of discussion, let client 112 be connected to (or associated with) AP 110. In such a case, AP 106, AP 108 and AP 104 will all be non-associated APs with respect to client 112.

When client 112 moves or when steering is imminent, a controller, which in this example is gateway 102, must know about the APs available to a client, before the controller may select a suitable AP for a client to transition. The controller may issue Non-Associated Client (NAC) report request to all the APs in the LAN. NAC reports typically contain a received signal strength indicator (RSSI) and a time stamp. Based on the RSSI values from all the APs, the controller may select the best destination AP for the client. APs gather the RSSI information (NA Report) from the probe request sent by the client. However, clients decide when to send probe request to APs.

In this example, gateway 102: transmits a NAC report request 122 to AP 104 over the pre-assigned Wi-Fi channel for AP 104; transmits a NAC report request 124 to AP 106 over the pre-assigned Wi-Fi channel for AP 106; and transmits a NAC report request 128 to AP 110 over the pre-assigned Wi-Fi channel for AP 110.

At this point, the APs within LAN 100 must wait for client 112 to issue a probe request. This will be described in greater detail with reference to FIG. 2.

Figure 2:
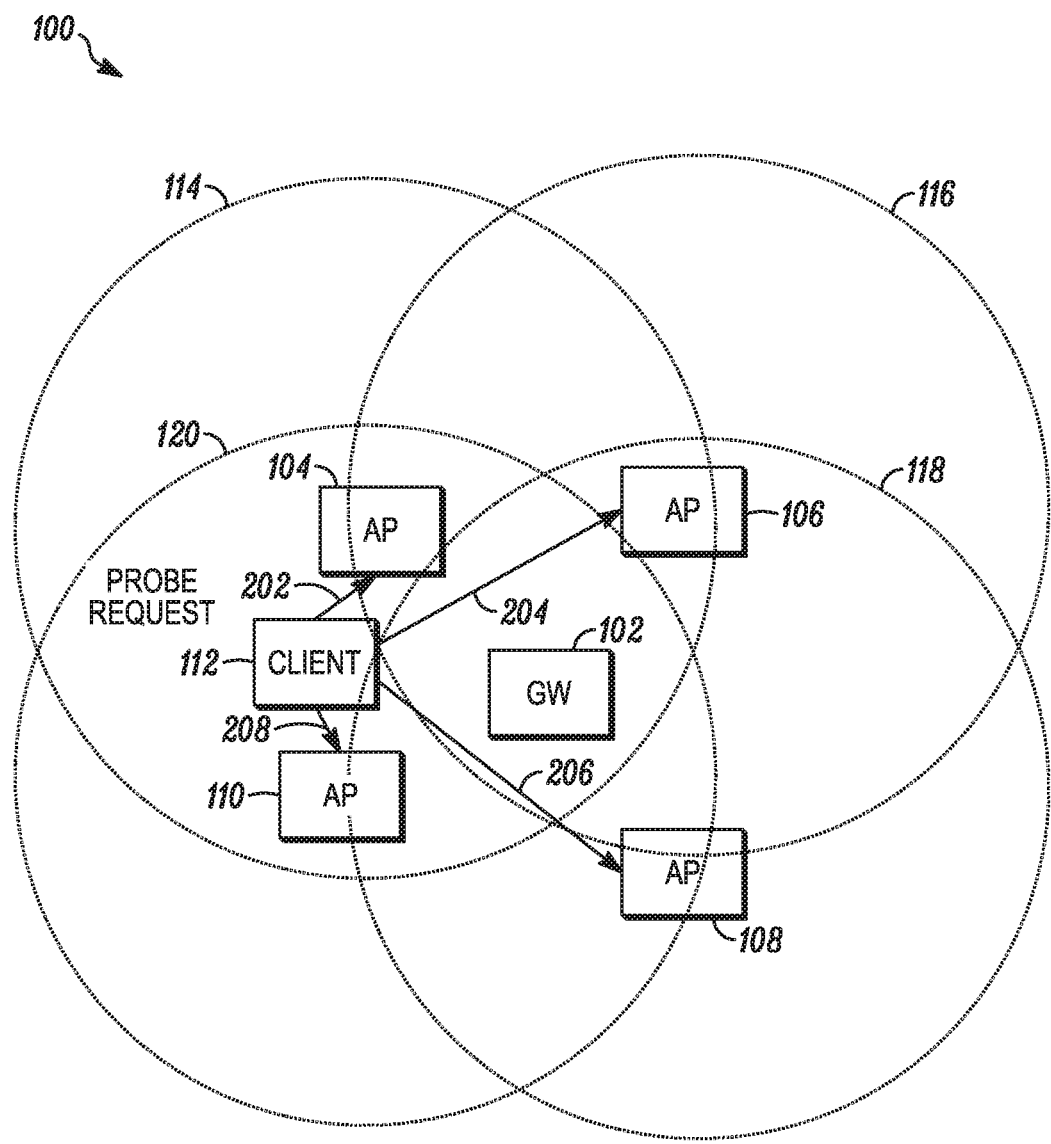
FIG. 2 illustrates the prior art LAN of FIG. 1 at a time $t_2$.

FIG. 2 illustrates a LAN 100 at a time $t_2$, wherein client 112 will have transmitted probe requests to the APs.

As shown in the figure, an unknown time after time $t_1$, at time $t_2$, client 112 will have transmitted: a probe request 202 to AP 104 over the pre-assigned Wi-Fi channel for AP 104; a probe request 204 to AP 106 over the pre-assigned Wi-Fi channel for AP 106; a probe request 206 to AP 108 over the pre-assigned Wi-Fi channel for AP 108; and a probe request 208 to AP 110 over the pre-assigned Wi-Fi channel for AP 110.

Again, in this example, presume that at time $t_2$, client 112 is associated with AP 110. Therefore, in response to probe request 202, AP 104 will prepare a NAC report indicating that AP 104 is not associated with client 112 and is available to be associated with client 112 should gateway 102 need to steer client 112. Further, in response to probe request 204, AP 106 will prepare a NAC report indicating that AP 106 is not associated with client 112 and is available to be associated with client 112 should gateway 102 consider steering client 112. Still further, in response to probe request 206, AP 108 will prepare a NAC report indicating that AP 108 is not associated with client 112 and is available to be associated with client 112 should gateway 102 consider steering client 112. Finally, in response to probe request 208, AP 110 will prepare a NAC report indicating that AP 110 is currently associated with client 112 and is available to continue to be associated with client 112 should gateway 102 consider steering client 112.

Conventionally, APs may be configured in two ways. First, an AP may be configured to collect the NA client report for all the clients. Second, an AP may be configured to collect the NA client report on an as-needed basis.

When a controller decides to steer a client from one AP to another AP in the LAN, the controller may instruct all the APs inside the LAN to monitor the client for a NA report. Then the controller may wait for approximately 1-5 secs to see whether or not an NA report is available from each AP. It is very unlikely that a client will send the probe request within 1-5 seconds to the Non-Associated APs when the controller decides to steer a client because the client decides when to send the probe request. This detrimentally affects the timely availability of non-associated clients and hinders a steering decision.

In the first approach, wherein the AP is configured to collect the NAC client report for all the clients, all the NAC reports are guaranteed to be received but the process of collection of NA reports for all the clients will be overhead for the Wi-Fi drivers, which results in the Wi-Fi performance degradation. Even if the performance issues due to monitoring all the clients for NAC reports are ignored, the NAC reports that list associated APs will be based on the last probe request from the client. However, when steering is imminent, some of the NAC reports might not provide the latest report, which may result in the controller selecting an incorrect destination AP for steering the client. This will be described with reference to FIG. 3A.

Figure 3A:
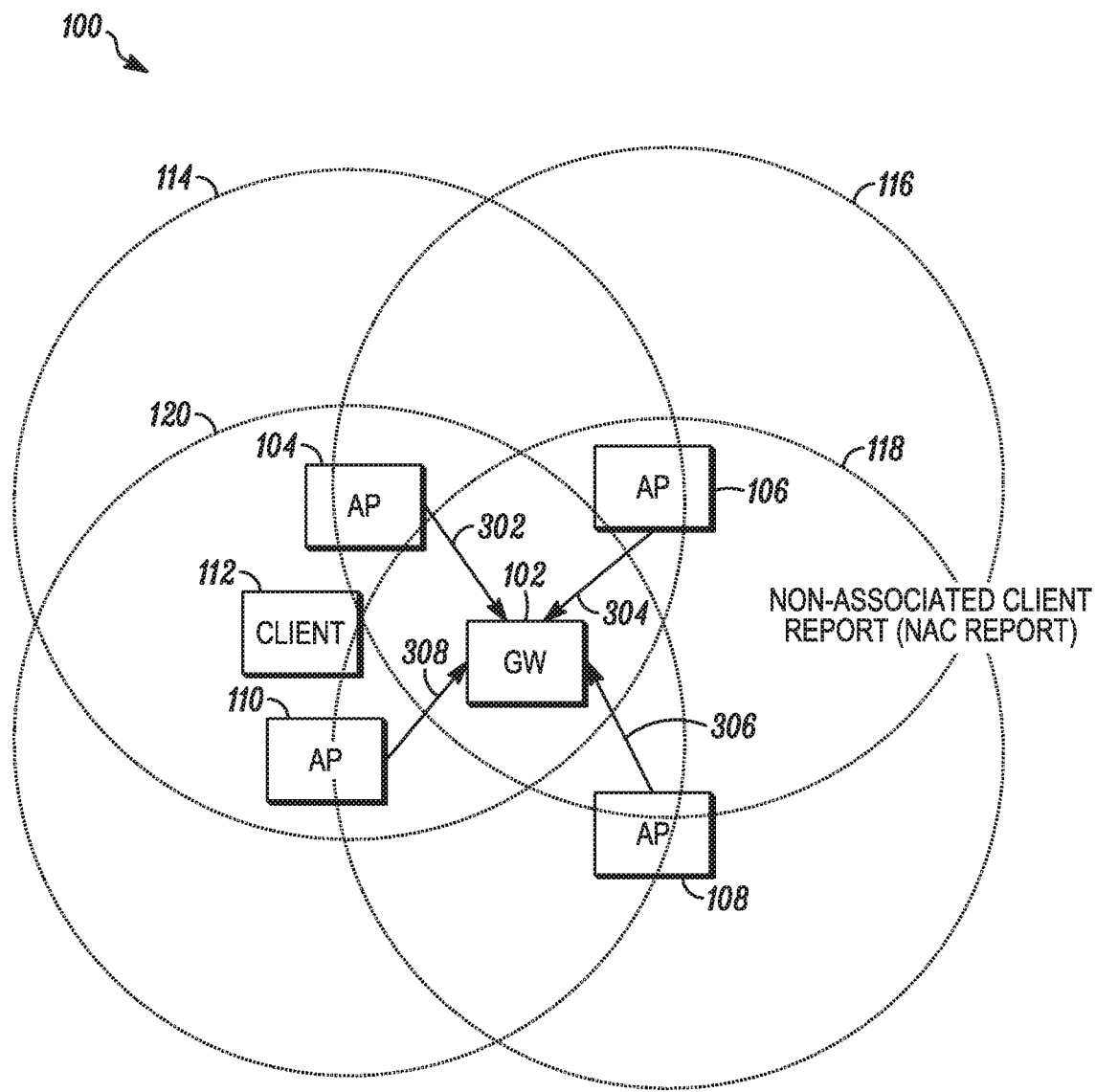
FIG. 3A illustrates the prior art LAN of FIG. 1 at a time $t_3$, wherein the APs are configured under a first approach.

FIG. 3A illustrates LAN 100 at a time $t_3$, when the APs have been configured under the first approach.

For purposes of discussion, presume that an unknown time after time $t_2$, at time $t_3$, client 112 has finally transmitted a respective probe request to all APs. In particular, client 112 has transmitted a probe request on all channels, wherein in some cases, such transmission is completed serially and in some cases the transmission is completed in parallel. In either case, client 112 expends a large amount of resources in the multiple channel transmission.

Further, in some cases, the time difference, $\Delta t$, between $t_3$ and $t_2$ may be relatively large. In fact, there may be cases wherein the RSSI of an AP changes within $\Delta t$. For example, as shown in FIG. 3A: AP 104 transmits a NAC report 302 to gateway 102; AP 106 transmits a NAC report 304 to gateway 102; AP 108 transmits a NAC report 306 to gateway 102 and AP 110 transmits a NAC report 308 to gateway 102.

In this case, presume that AP 104 is the first AP to transmit a NAC report and AP 108 is the last AP to transmit a NAC report. More specifically, presume that $\Delta t$ is very large because of the time difference between when client 112 transmits one probe request to AP 104 and when client 112 transmits a fourth probe request to AP 108. In this example, by the time client 112 had transmitted the fourth probe request to AP 108, the RSSI of AP 104 had changed. As will be discussed below with reference to FIG. 4, this change in the RSSI of AP 104 might lead to an erroneous steering of client 112 by gateway 102.

The second approach of configuring APs, wherein an AP may be configured to collect the NAC report on an as-needed basis, avoids the overhead on the drivers. However, this second approach does not guarantee the timely availability of the NAC report. From test results, NAC reports are not available most of the times with this approach. Because not all NAC reports are available when steering is imminent for the client, the controller may select a destination AP that is not best for steering the client. This will be described with reference to FIG. 3B.

Figure 3B:
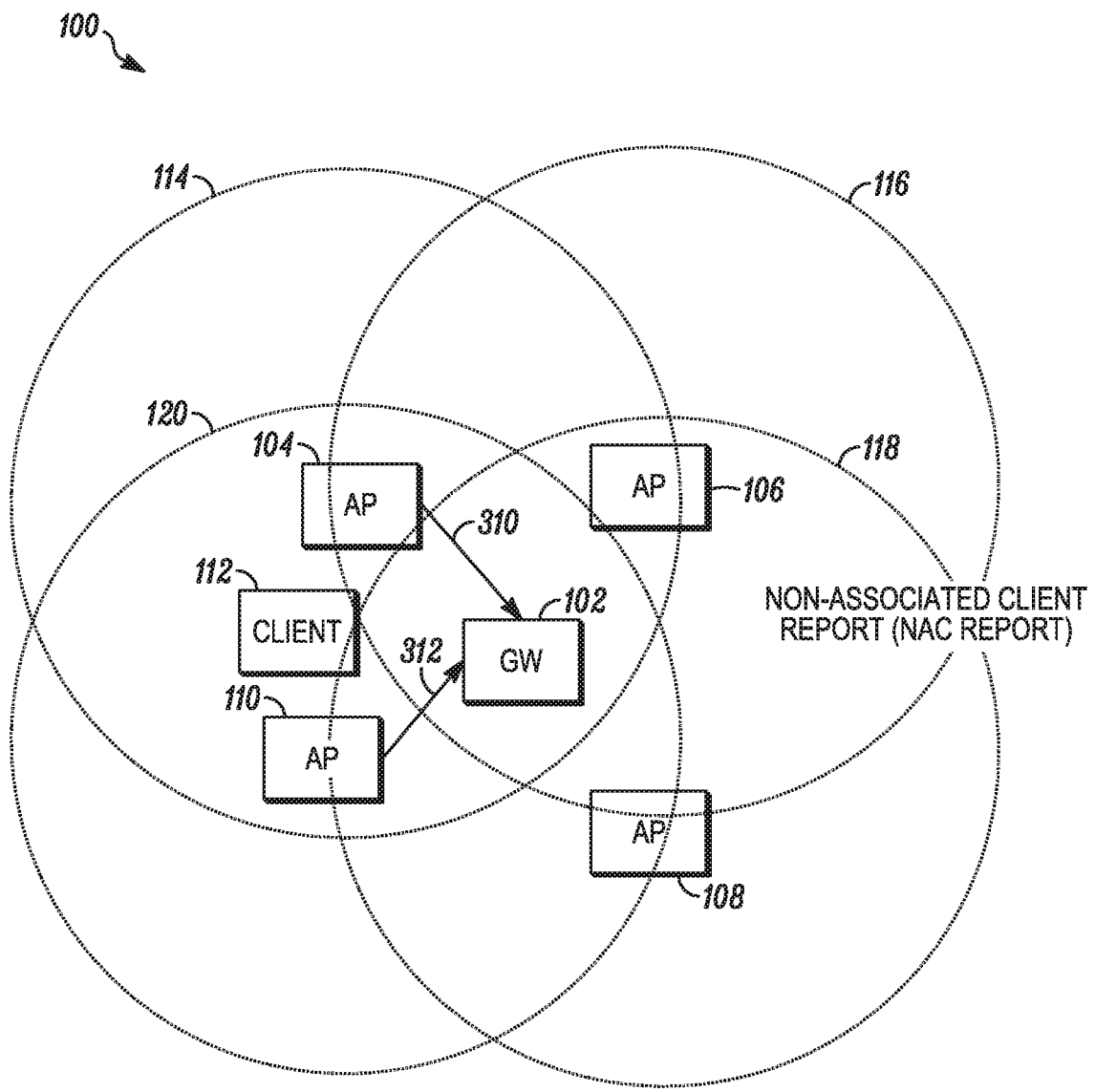
FIG. 3B illustrates the prior art LAN of FIG. 1 at a time $t_3$, wherein the APs are configured under a second approach.

FIG. 3B illustrates LAN 100 at a time $t_3$, when the APs have been configured under the second approach.

For purposes of discussion, presume that an unknown time after time $t_2$, at time $t_3'$, client 112 has transmitted a probe request to AP 104 and a probe request to AP 110.

In this case, the time difference, $\Delta t'$, between $t_3'$ and $t_2$ is much smaller than the $\Delta t$ as discussed above with reference to FIG. 3A. As shown in FIG. 3B: AP 104 transmits a NAC report 310 to gateway 102; and AP 110 transmits a NAC report 312 to gateway 102. However, in this example, AP 106 and AP 108 do not send NAC reports to gateway 102.

In this case, the time for gateway 102 to receive NAC reports 310 and 312 is much smaller than the time for gateway 102 to receive NAC reports 302, 304, 306 and 308 discussed above with reference to FIG. 3A. Accordingly, the process is much quicker. However, because gateway 102 does not receive NAC reports from AP 106 and AP 108 in the second approach of FIG. 3B, gateway 102 will determine the steering instruction for client 112 based only on the information in NAC reports 310 and 312. Thus, even in the situation where AP 108 might have been a better candidate to steer client 112, gateway 102 will not consider AP 108 as a possible candidate as gateway 102 did not receive a NAC report from AP 108. Accordingly, it is possible that gateway 112 might steer client 112 to a less favorable AP 104, which would not optimize the resources of LAN 100.

Whether using first or second approach, after receiving NAC reports, gateway 102 sends a steering instruction. This will be described with reference to FIG. 4.

Figure 4:
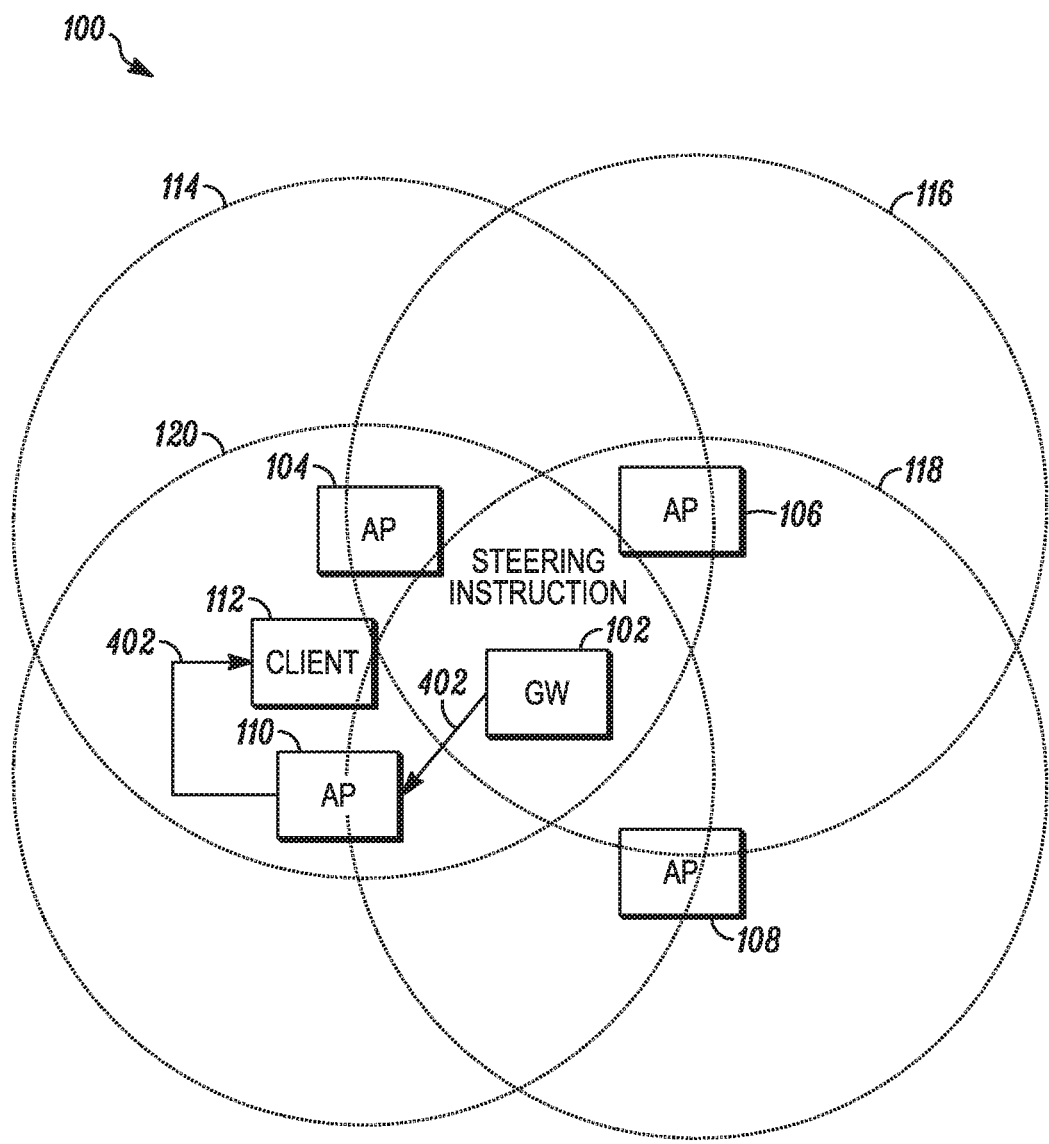
FIG. 4 illustrates the prior art LAN of FIG. 1 at a time $t_4$.

FIG. 4 illustrates LAN 100 at a time $t_4$, wherein gateway 102 transmits a steering instruction to client 112.

As shown in the figure, gateway 102 transmits a steering instruction 402 to client 112. In this example, steering instruction 402 is provided to client 112 by way of AP 110. In this example, for purposes of discussion, let steering instruction 402 instruct client 112 to disconnect from AP 110 and to connect to AP 104.

Figure 5:
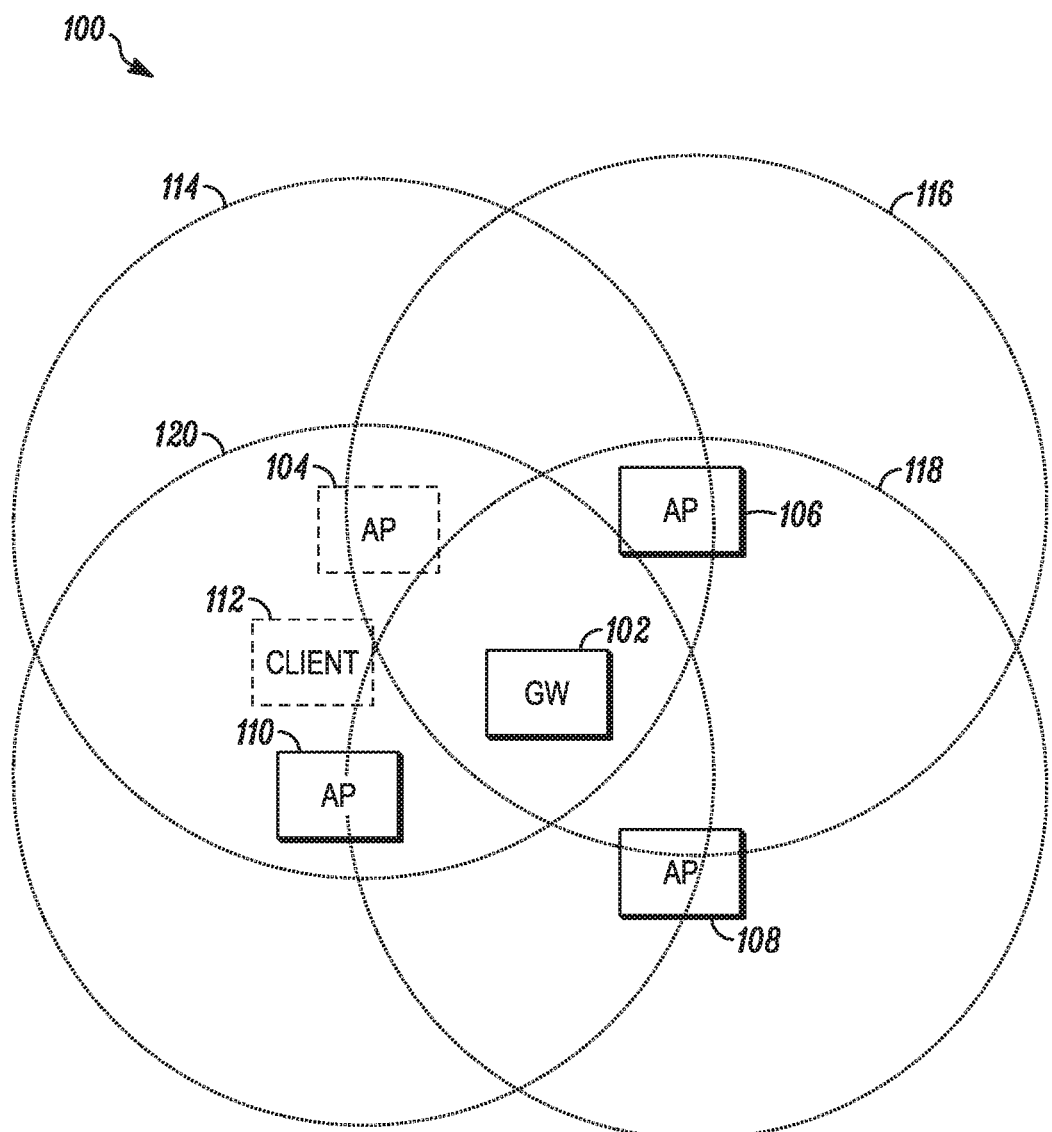
FIG. 5 illustrates the prior art LAN of FIG. 1 at a time $t_5$.

FIG. 5 illustrates LAN 100 at a time $t_5$, wherein client 112 has been steered to AP 104.

As shown in the figure, at time $t_5$, client 112 is connected to AP 104, as indicated by the dotted lines of client 112 and AP 104.

Although client 112 is now connected to AP 104, if the first approach of configuring the APs of LAN 100 were used, the time to send steering instruction 402 might be so long that AP 104 is no longer the best AP for client 112. On the other hand, if the second approach of configuring the APs of LAN 100 were used, AP 104 might not have been the best choice of all the APs, but only the best choice the few APs that were able to send a NAC report.

In the above example network 100, there is only a single client, which is client 112. It should be noted however, that in many networks, multiple clients are monitored for steering in in order to optimize network resources. Accordingly, each monitored client is at risk of being incorrectly steered for the same reasons as discussed above with reference to client 112.

What is needed is a system and method for steering a client that includes the latest reports for all the APs with timely availability.

A system and method for steering a client in accordance with aspects of the present disclosure includes the latest reports for all the APs with timely availability.

In accordance with the present disclosure a probe request is triggered from the client to be steered. When a gateway decides to steer a client, the gateway will first request the client to issue probe request. In an example embodiment, Wi-Fi drivers may issue the probe request. Next, the gateway may request all the APs of the LAN to collect the NAC request for a specific client and wait for the NAC report. The gateway can poll for NAC report with a predetermined poll duration, in a non-limiting example, the poll duration may be 1 second and total poll time of 5 seconds. In some example embodiments, this poll duration and total poll time is configurable. Finally, once the probe request has been sent by the client, the APs will collect the NAC report and provide the report to the gateway. The gateway can use NA reports and select the best destination AP for the steering operation. With this method, the steering decision is accelerated.

An example system and method for steering a client to an AP within a LAN in accordance with aspects of the present disclosure will now be described in greater detail with reference to FIGS. 6-15.

Figure 6:
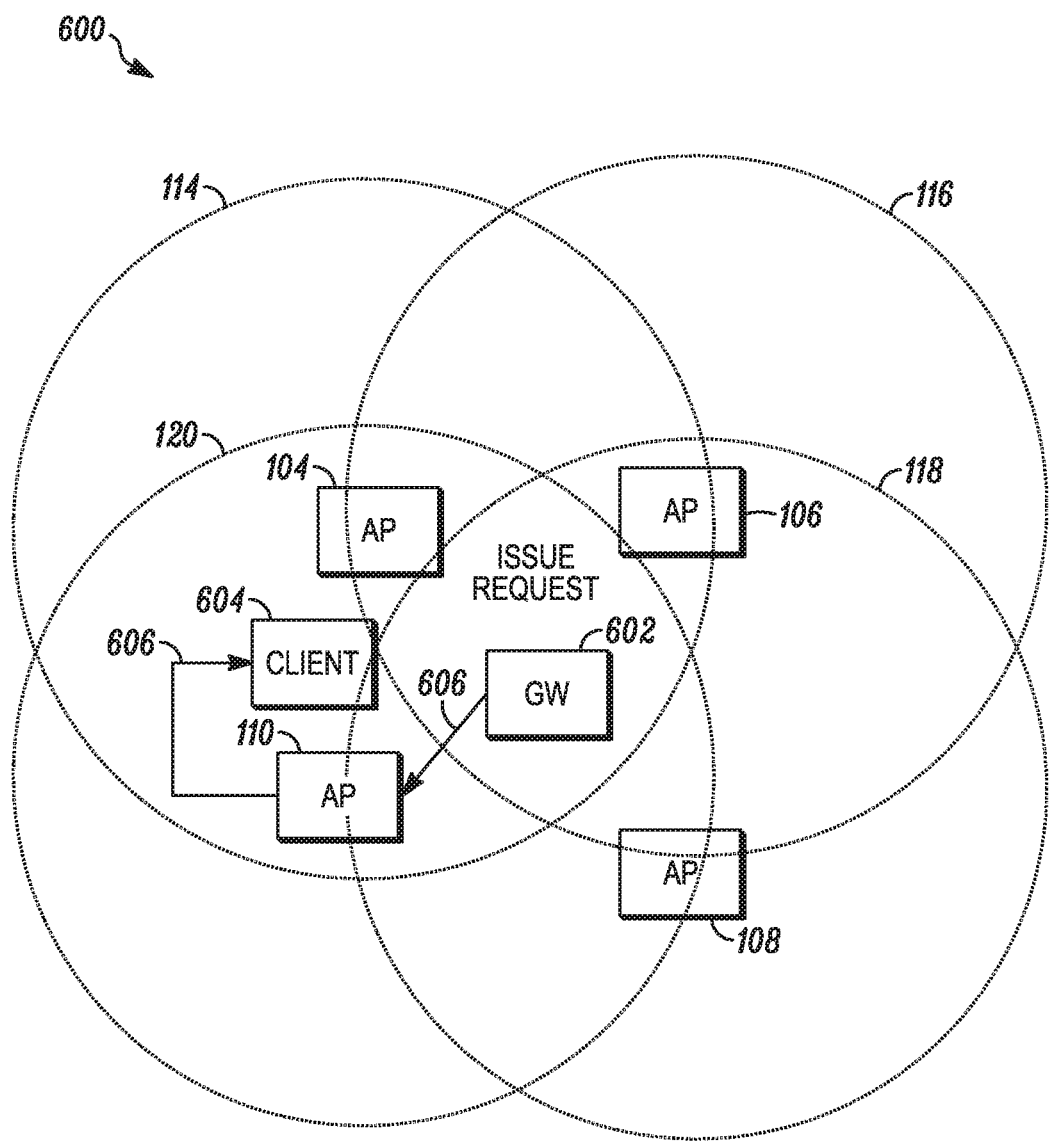
FIG. 6 illustrates a LAN in accordance with aspects of the present disclosure at a time $t_6$.

FIG. 6 illustrates a LAN 600 in accordance with aspects of the present disclosure at a time $t_6$.

LAN 600 differs from LAN 100 discussed above in that in LAN 600, a gateway 602 has replaced gateway 102 and a client 604 has replaced client 112.

More generally speaking, LAN 600 includes a gateway 602 for use with client device 604 and a number n APs. Client device 604 is operable to communicate with a number m access points, $1 \leq m \leq n$, wherein m and n are integers. In this example, m=n. However, there may be embodiments wherein n>m, such that client device 604 is unable to directly communicate with at least one of the APs. Each of then access points is operable to communicate with gateway 602.

Figure 7:
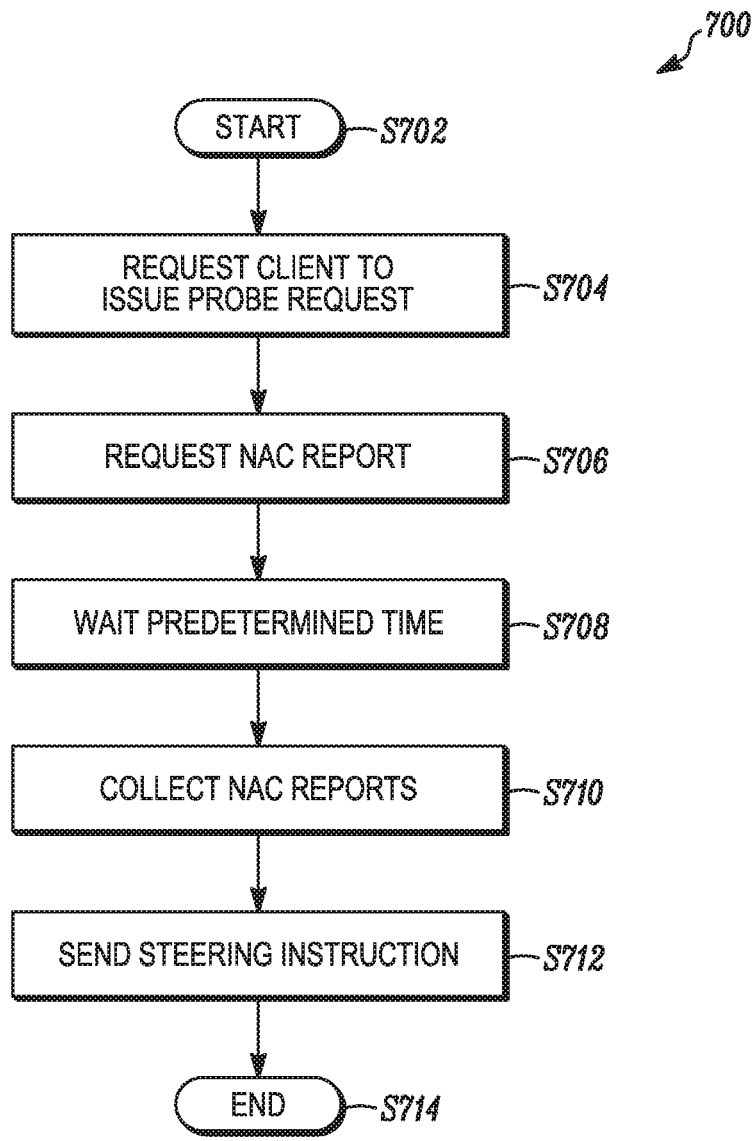
FIG. 7 illustrates a method of controlling a LAN in accordance with aspects of the present disclosure.

FIG. 7 illustrates a method 700 of controlling a LAN in accordance with aspects of the present disclosure.

As shown in the figure, method 700 starts (S702) and the client device is requested to issue a probe request (S704). In an example embodiment, gateway 602 transmits a request to client 604 to issue a probe request.

For example, as shown in FIG. 6, gateway 602 transmits an issue request 606 to client 604. Gateway 602 may transmit issue request 606 to client 604 in any known manner. In an example embodiment, gateway 602 transmits issue request 606 to client 604 via an AP that is currently connected to client 604 via IEEE 802.11 protocols. For purposes of discussion, in this example, let client 604 be connected to AP 110 at time $t_6$. Accordingly, gateway 602 transmits issue request 606 to client 604 via AP 110. This will be described in greater detail with reference to FIGS. 8-10.

Figure 8:
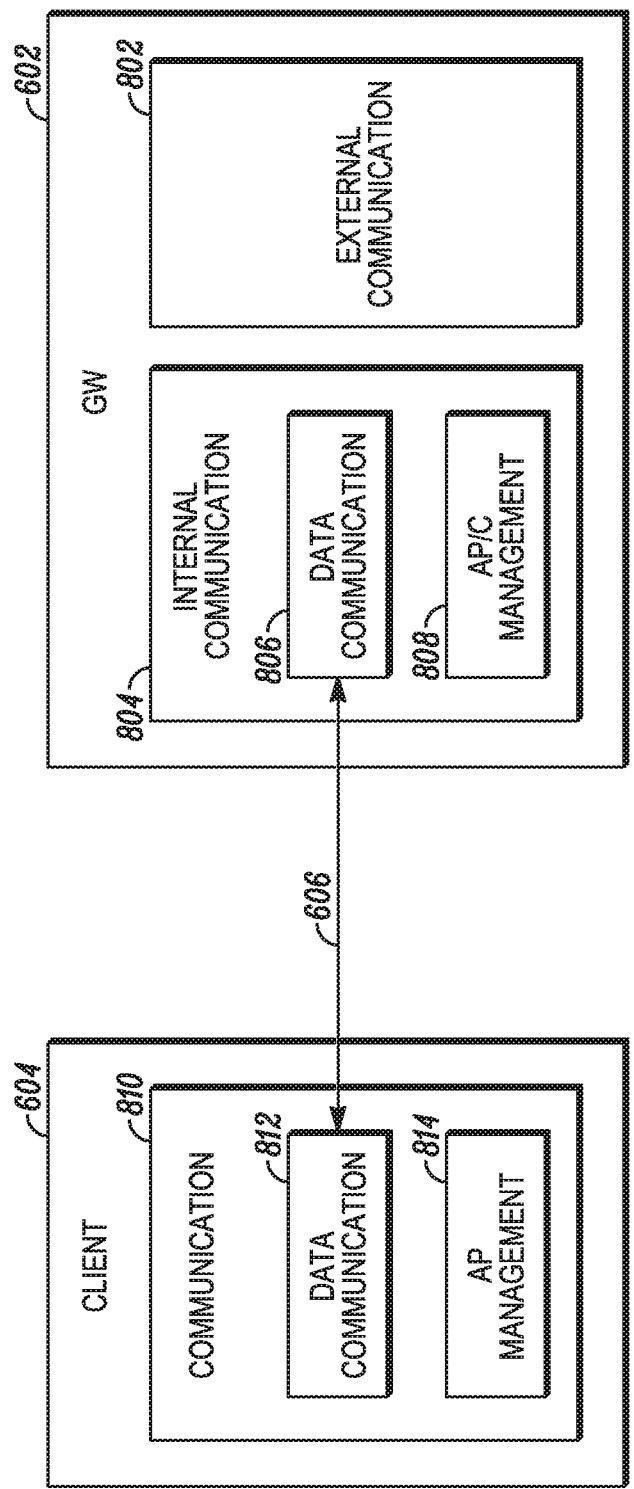
FIG. 8 illustrates an exploded view of the gateway and the client device of the LAN of FIG. 6, in accordance with aspects of the present disclosure.

FIG. 8 illustrates an exploded view of gateway 602 and client device 604 of LAN 600.

As shown in the figure, gateway 602 includes an external communication component 802 and an internal communication component 804.

In this example, external communication component 802 and internal communication component 804 are illustrated as individual devices. However, in some embodiments, external communication component 802 and internal communication component 804 may be combined as a unitary device. Further, in some embodiments, at least one of external communication component 802 and internal communication component 804 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an application specific integrated circuit ("ASIC"). In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; and (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

In a layered system, a unit of data that is specified in a protocol of a given layer (e.g., a "packet" at the network layer), and which includes protocol-control information and possibly user data of that layer, is commonly referred to as a "protocol data unit" or PDU. At the network layer, data is formatted into data packets (e.g., IP datagrams, Ethernet Frames, or other network layer packets).

Internal communication component 804 includes a data communication component 806 and an access point/client (AP/C) management component 808.

In this example, data communication component 806 and AP/C management component 808 are illustrated as individual devices. However, in some embodiments, data communication component 806 and AP/C management component 808 may be combined as a unitary device. Further, in some embodiments, at least one of data communication component 806 and AP/C management component 808 may be implemented as a computer having tangible computer-readable media for carrying or having computer-executable instructions or data structures stored thereon.

Client device 604 includes a communication component 810, which includes a data communication component 812 and an AP management component 814.

In this example, data communication component 812 and AP management component 814 are illustrated as individual devices. However, in some embodiments, data communication component 812 and AP management component 814 may be combined as a unitary device. Further, in some embodiments, at least one of data communication component 812 and AP management component 814 may be implemented as a computer having tangible computer-readable media for carrying or having computer-executable instructions or data structures stored thereon.

Returning to FIG. 6, in operation, gateway 602 generates issue request 606. This is described in greater detail with reference to FIG. 8.

As shown in FIG. 8, external communication component 802 may be any device or system that is operable to enable communications to an external network. For example, if LAN 600 were connected to the internet via gateway 602, then external communication component 802 would enable communications between other components within LAN 600 and the internet.

Internal communication component 804 may be any device or system that is operable to manage communications between elements within LAN 600.

Data communication component 806 may be any device or system that is operable to transmit and receive communications between elements within LAN 600, by any known manner. In general, data communication component 806 is operable to communicate with each of the n access points in a LAN. In this non-limiting example of LAN 600, n is 4. In a non-limiting example embodiment, data communication component 806 is operable to transmit and receive communications within IEEE 802.11 protocols, including communication with each of the n APs and communications with client device 604, including the issue request. As will be described in more detail below, data communication component 806 is further operable to: transmit a NAC report request to the n APs; transmit an issue request to the client device; transmit a steering instruction to client device 604; communicate with each of the n APs over n respective channels of a plurality p channels, wherein 1<n≤p. In other words, there may be some channels available that are not used by any APs.

AP/C management component 808 may be any device or system that is operable to manage APs and clients within LAN 600. As will be described in more detail below, AP/C management component 808 is operable to: generate a NAC report request, to generate an issue request, and to generate a steering instruction; generate the steering instruction based on the n non-associated NAC reports; and generate the issue request so as to include information identifying the n channels. AP/C management component 808 will be described in more detail with reference to FIG. 9.

Figure 9:
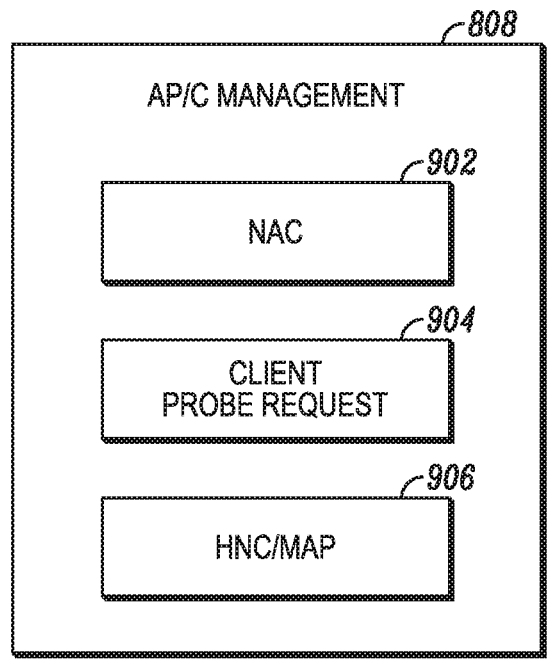
FIG. 9 illustrates an exploded view of the AP/C management component of the gateway of FIG. 8, in accordance with aspects of the present disclosure.

FIG. 9 illustrates an exploded view of AP/C management component 808 of gateway 602.

As shown in the figure, AP/C management component 808 includes a NAC component 902, a client probe request component 904 and a home network controller/multi AP protocol (HNC/MAP) component 906.

In this example, NAC component 902, client probe request component 904 and HNC/MAP component 906 are illustrated as individual devices. However, in some embodiments, at least two of NAC component 902, client probe request component 904 and HNC/MAP component 906 may be combined as a unitary device. Further, in some embodiments, at least one of NAC component 902, client probe request component 904 and HNC/MAP component 906 may be implemented as a computer having tangible computer-readable media for carrying or having computer-executable instructions or data structures stored thereon.

NAC component 902 may be any device or system that is operable to generate NAC report requests and manage received NAC reports. Client probe request component 904 may be any device or system that is operable to generate an issue request to instruct a client to issue a probe request. HNC/MAP component 906 may be any device or system that is operable to manage resources within LAN 600 and generate steering instructions for clients within LAN 600.

In operation, client probe request component 904 generates an issue request and instructs data communication component 806 to transmit the generated issue request to client 604. Returning to FIG. 8, data communication component transmits issue request 606 to client 604.

An issue request will instruct a client to transmit a NAC report request to all APs for which a client is able to communicate. In LAN 600, issue request 606 will instruct client 604 to transmit a NAC report request to AP 104, 106, 108 and 110.

Further, an issue request will instruct a client as to what channels to transmit the NAC report requests. In this example, issue request 606 will instruct client 604 as to the respective channel to transmit the NAC report request to AP 104, the respective channel to transmit the NAC report request to AP 106, the respective channel to transmit the NAC report request to AP 108, and the respective channel to transmit the NAC report request to AP 110. In this manner, client 604 does not need to transmit the NAC report request on all available channels. By only transmitting on the channels for which the APs within LAN 600 are respectively communicating, time and energy are saved in the transmission.

Client 604 receives issue request 606. This will be described in greater detail with reference to FIGS. 8 and 10.

As shown in FIG. 8, data communication component 812 may be any device or system that is operable to transmit and receive communications between elements within LAN 600, by any known manner. In general, data communication component 812 is operable to communicate with m access points, 1≤m≤n, wherein m and n are integers. In this example, m=n. However, there may be embodiments wherein n>m, such that data communication component 812 is unable to directly communicate with at least one of the APs. In a non-limiting example embodiment, data communication component 812 is operable to transmit and receive communications within IEEE 802.11 protocols, including communication with each of the m APs over the respective channels of the m APs.

AP management component 814 is operable to generate a probe request based on an issue request received from gateway 602.

Figure 10:
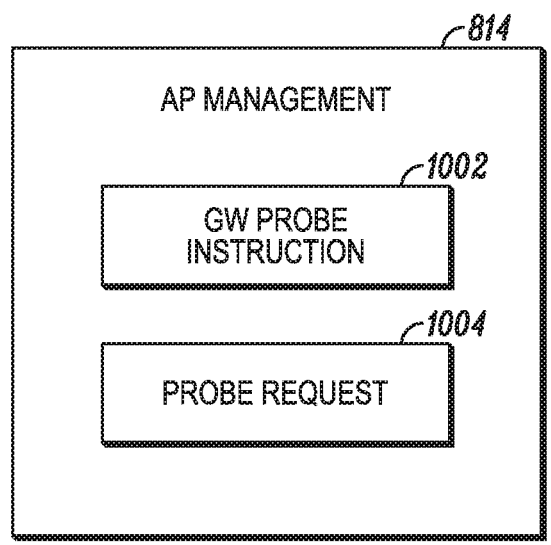
FIG. 10 illustrates an exploded view of the AP management component of the client device of FIG. 8, in accordance with aspects of the present disclosure.

FIG. 10 illustrates an exploded view of AP management component 814 of client device 604.

As shown in the figure, AP management component 814 includes a gateway probe instruction component 1002 and a probe request component 1004.

In this example, gateway probe instruction component 1002 and probe request component 1004 are illustrated as individual devices. However, in some embodiments, gateway probe instruction component 1002 and probe request component 1004 may be combined as a unitary device. Further, in some embodiments, at least one of gateway probe instruction component 1002 and probe request component 1004 may be implemented as a computer having tangible computer-readable media for carrying or having computer-executable instructions or data structures stored thereon.

Gateway probe instruction component 1002 may be any device or system that is operable to manage issue requests from gateway 602. Probe request component 1004 may be any device or system that is operable to generate probe requests.

In operation, returning to FIG. 6, when gateway 602 transmits issue request 606, for example by way of internal communication component 804 as shown in FIG. 8, and by way of client probe request component 904 as shown in FIG. 9, issue request 606 is ultimately received by data communication component 812 of client 604 as shown in FIG. 8. As discussed above, issue request 606 includes information that identifies the channels for which client 604 should transmit a probe request for the respective APs.

Data communication component 812 provides issue request 606 to AP management component 814. As shown in FIG. 10, gateway probe instruction 1002 extracts the information that identifies the channels for which client 604 should transmit a probe request for the respective APs.

Returning to FIG. 7, after the client device is requested to issue a probe request (S704), NAC reports are requested (S706). In an example embodiment, gateway 602 is further operable to transmit a NAC report request to the APs.

Figure 11:
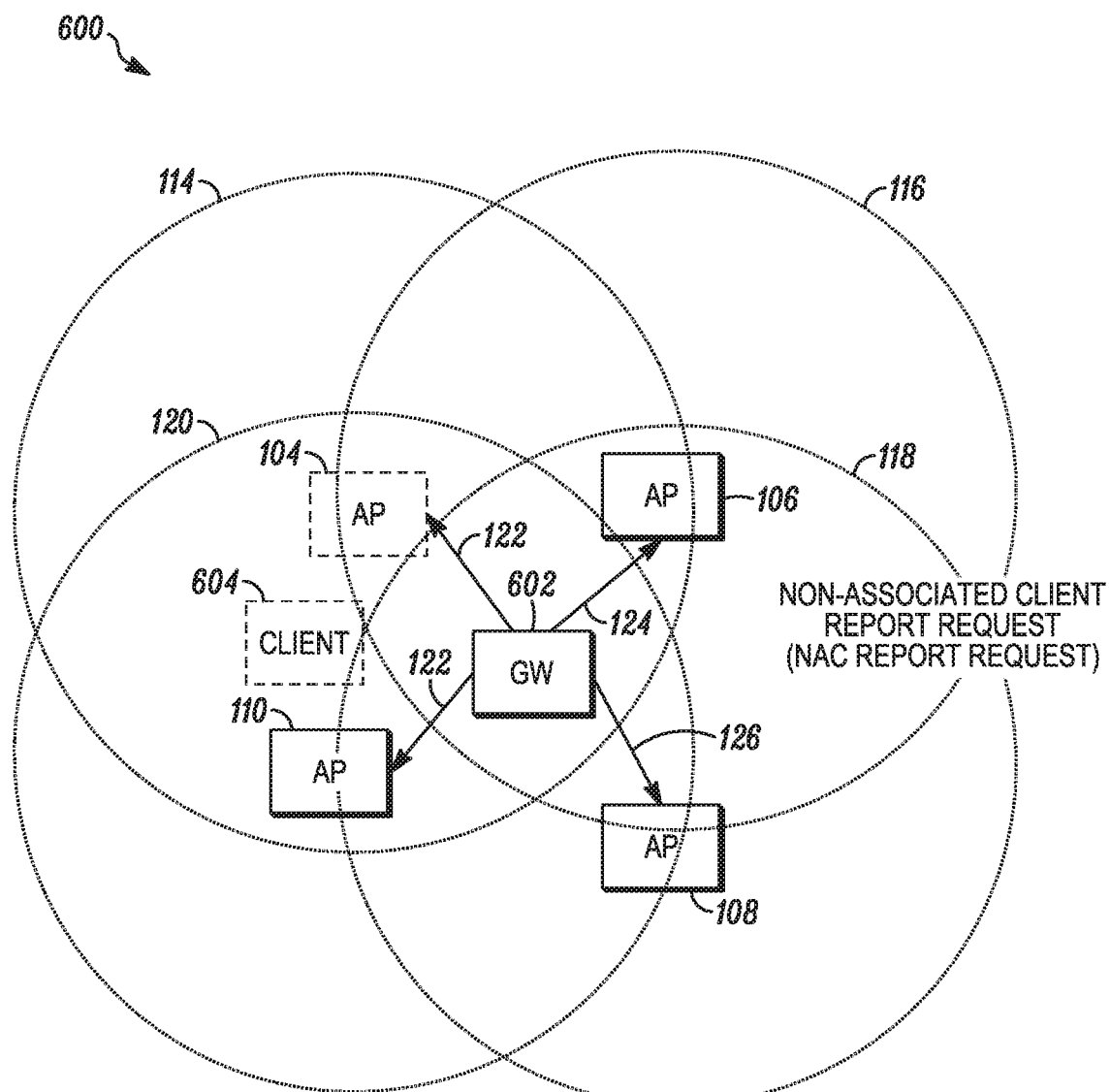
FIG. 11 illustrates the LAN of FIG. 6 at a time $t_7$, in accordance with aspects of the present disclosure.

FIG. 11 illustrates LAN 600 at a time $t_7$, NAC report requests are sent from gateway 602 to the APs.

For purposes of discussion, let client 604 be connected to (or associated with) AP 110. In such a case, AP 106, AP 108 and AP 104 will all be non-associated APs with respect to client 604.

When client 604 moves or when steering is imminent, a controller, which in this example is gateway 602, must know about the APs available to a client, before the controller may select a suitable AP for a client to transition. The controller may issue a NAC report request to all the APs in the LAN. As shown in FIG. 11, gateway 602 transmits a NAC report request 122 to each of AP 104, AP 106, AP 108 and AP 110.

In this example, gateway 602: transmits NAC report request 122 to AP 104 over the pre-assigned Wi-Fi channel for AP 104; transmits NAC report request 124 to AP 106 over the pre-assigned Wi-Fi channel for AP 106; transmits NAC report request 126 to AP 108 over the pre-assigned Wi-Fi channel for AP 108 and transmits NAC report request 128 to AP 110 over the pre-assigned Wi-Fi channel for AP 110.

At this point, the APs within LAN 100 must wait for client 604 to issue a probe request. However, in contrast with the system discussed above with reference to FIGS. 1-6, in accordance with aspects of the present disclosure, gateway 602 has previously transmitted an issue request to client 604 to instruct client 604 to transmit a probe request to all APs.

Figure 12:
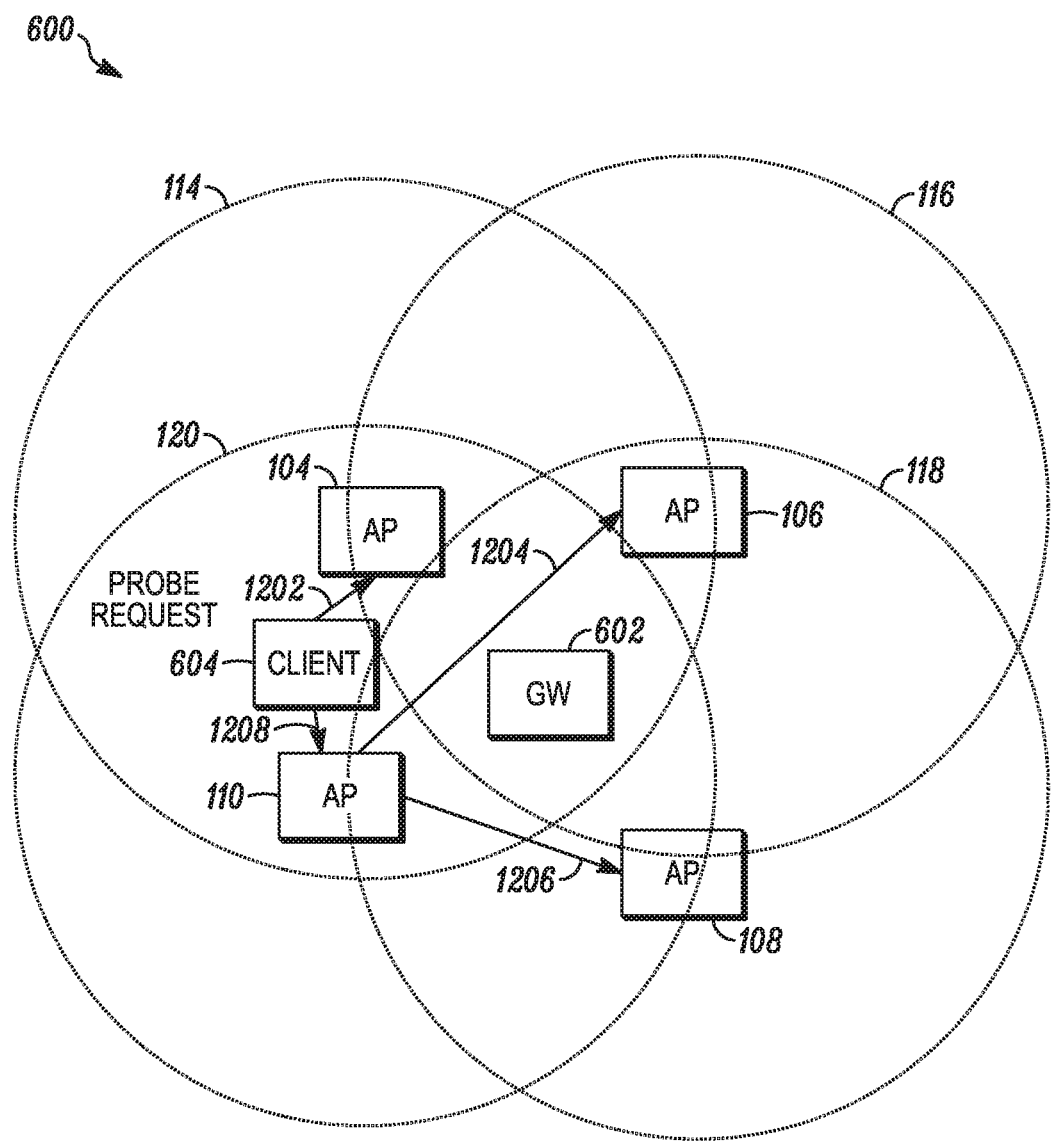
FIG. 12 illustrates the LAN of FIG. 6 at a time $t_8$, in accordance with aspects of the present disclosure.

FIG. 12 illustrates LAN 600 at a time $t_8$, wherein client 604 will have transmitted probe requests to the APs.

As shown in the figure, client 604 transmits a probe request to each of the APs. In particular, as shown in FIG. 10, gateway probe instruction 1002 extracts the information that identifies the channels for which client 604 should transmit a probe request for the respective APs. This information is provided to data communication component 812 as shown in FIG. 8. Further, as shown in FIG. 10, gateway probe instruction component 1002 generates a probe request based on issue request 606 from gateway 602, and provides the probe request to data communication component 812 as shown in FIG. 8.

Data communication component 812 then transmits a probe request, as provide by probe request component 1004 to each of the APs over a channel as identified by gateway probe instruction component 1002.

In this example, returning to FIG. 12, client 604: transmits a probe request 1202 to AP 104 over the pre-assigned Wi-Fi channel for AP 104; transmits a probe request 1204 to AP 106 over the pre-assigned Wi-Fi channel for AP 106; transmits a probe request 1206 to AP 108 over the pre-assigned Wi-Fi channel for AP 108; and transmits a probe request 1208 to AP 110 over the pre-assigned Wi-Fi channel for AP 110.

Figure 13:
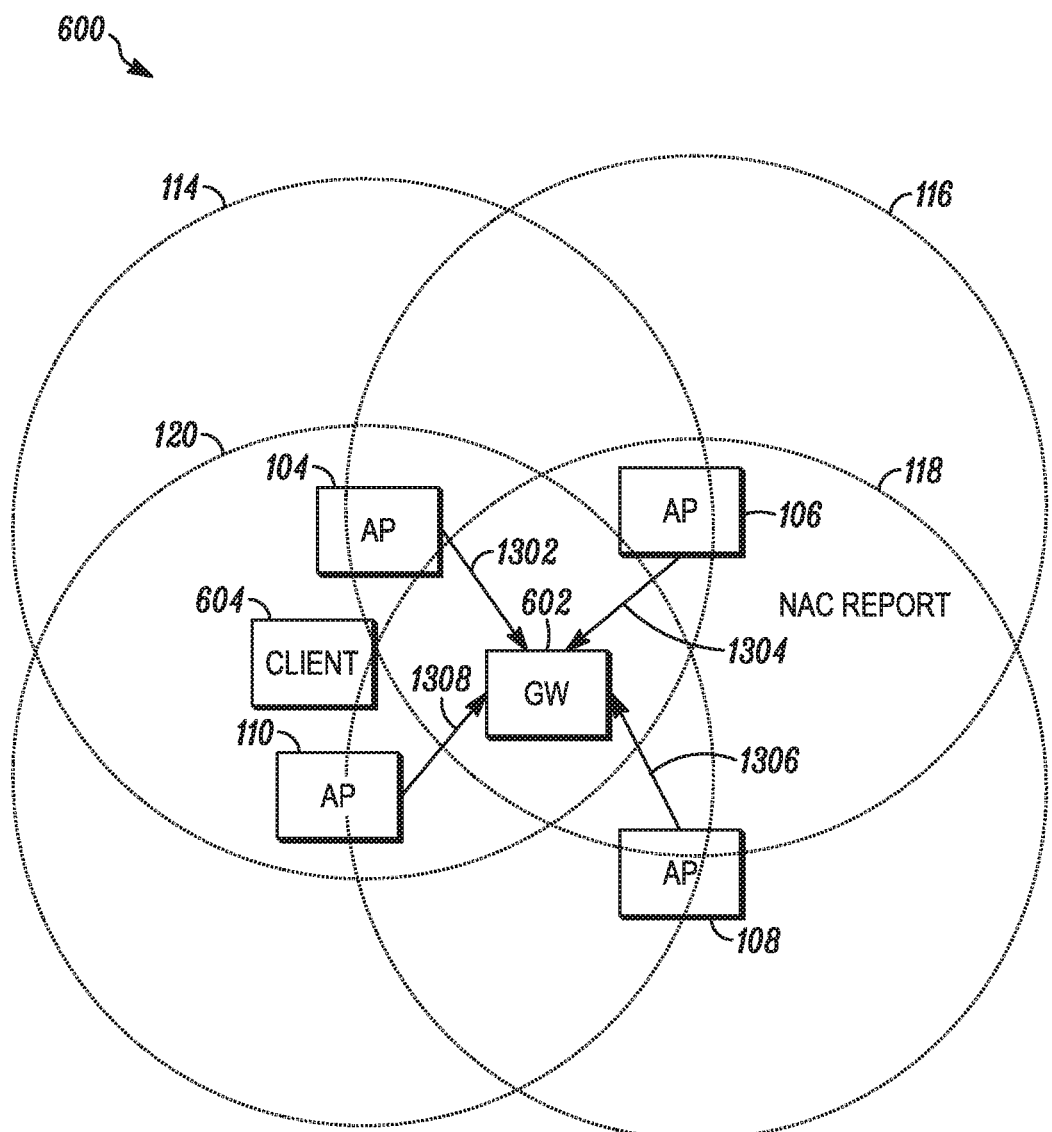
FIG. 13 illustrates the LAN of FIG. 6 at a time $t_9$, in accordance with aspects of the present disclosure.

FIG. 13 illustrates LAN 600 at a time $t_9$, when the APs will have sent NAC reports to gateway 602.

As shown in the figure, AP 104 transmits a NAC report 1302 to gateway 602 over the pre-assigned Wi-Fi channel for AP 104; AP 106 transmits a NAC report 1304 to gateway 602 over the pre-assigned Wi-Fi channel for AP 106; AP 108 transmits a NAC report 1306 to gateway 602 over the pre-assigned Wi-Fi channel for AP 108 and AP 110 transmits a NAC report 1308 to gateway 602 over the pre-assigned Wi-Fi channel for AP 110.

As shown in FIG. 9, NAC component 902 receives the NAC reports from the APs within LAN 600.

Returning to FIG. 7, after all the NAC reports will have been collected (S710), a steering instruction is sent (S712). In an example embodiment, gateway 602 sends a steering instruction to client 604.

Figure 14:
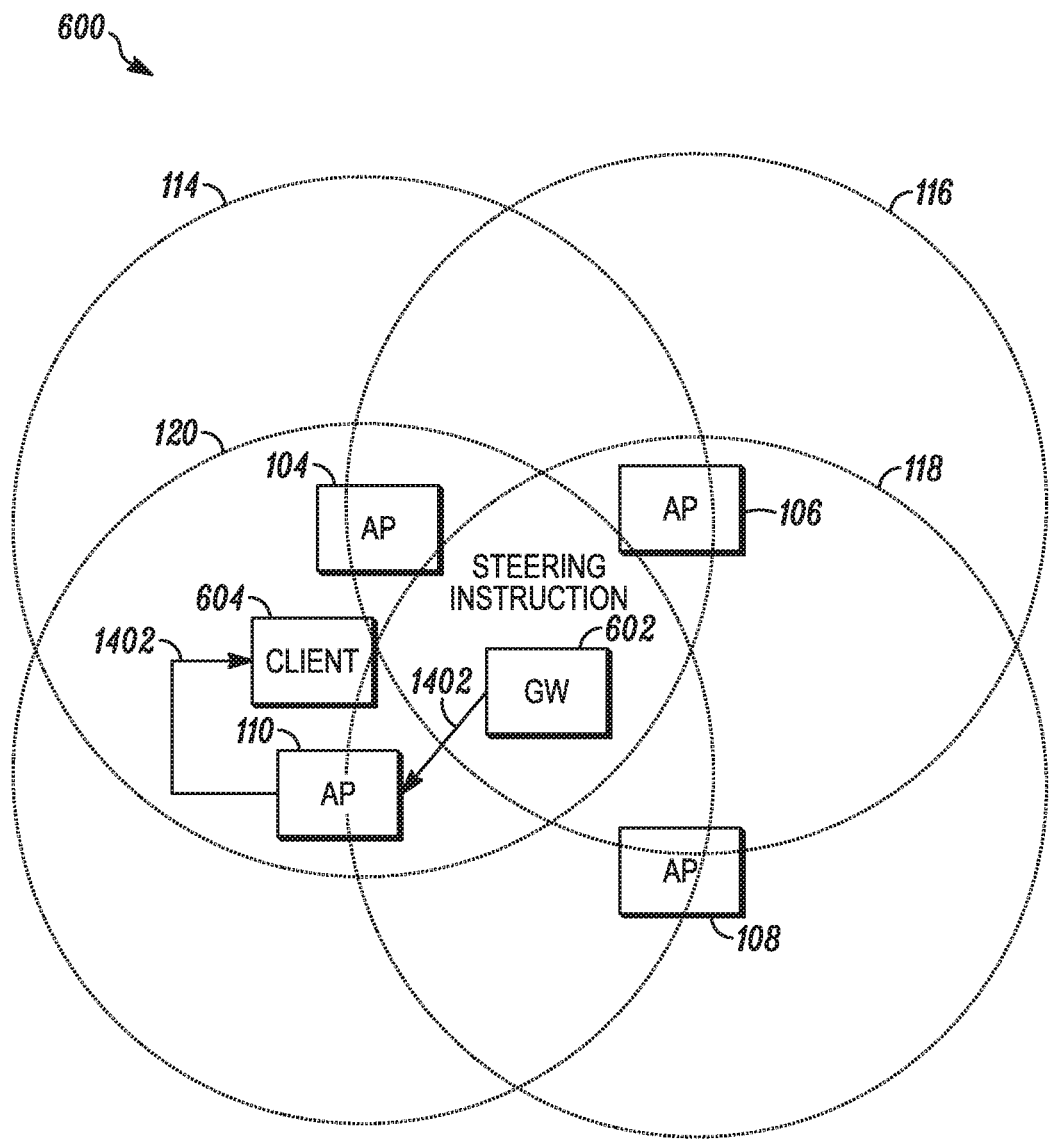
FIG. 14 illustrates the LAN of FIG. 6 at a time $t_{10}$, in accordance with aspects of the present disclosure.

FIG. 14 illustrates LAN 600 at a time $t_{10}$, wherein gateway 602 transmits a steering instruction to client 604.

As shown in the figure, gateway 602 transmits a steering instruction 1402 to client 604. In this example, steering instruction 1402 is provided to client 604 by way of AP 110. In this example, for purposes of discussion, let steering instruction 1402 instruct client 604 to disconnect from AP 110 and to connect to AP 104.

In accordance with aspects of the present disclosure, the waiting time for gateway 602 to receive the NAC reports from the APs will be drastically reduced because gateway 602 had previously instructed client 604 to issue a probe request to all the APs. Further, because the issue request included information identifying what channels to use, gateway saves resources by not transmitting probe requests on channels that are not used by any APs.

Furthermore, because gateway 602 had previously instructed client 604 to issue a probe request to all the APs, the probe requests are quickly transmitted. As a result, the NAC reports are subsequently quickly transmitted to gateway 602. Therefore, the RSSI data corresponding to each AP is relatively recent and accurate as compared to the prior art systems discussed above.

Returning to FIG. 7, a steering instruction is sent (S712), method 700 stops (S714).

Figure 15:
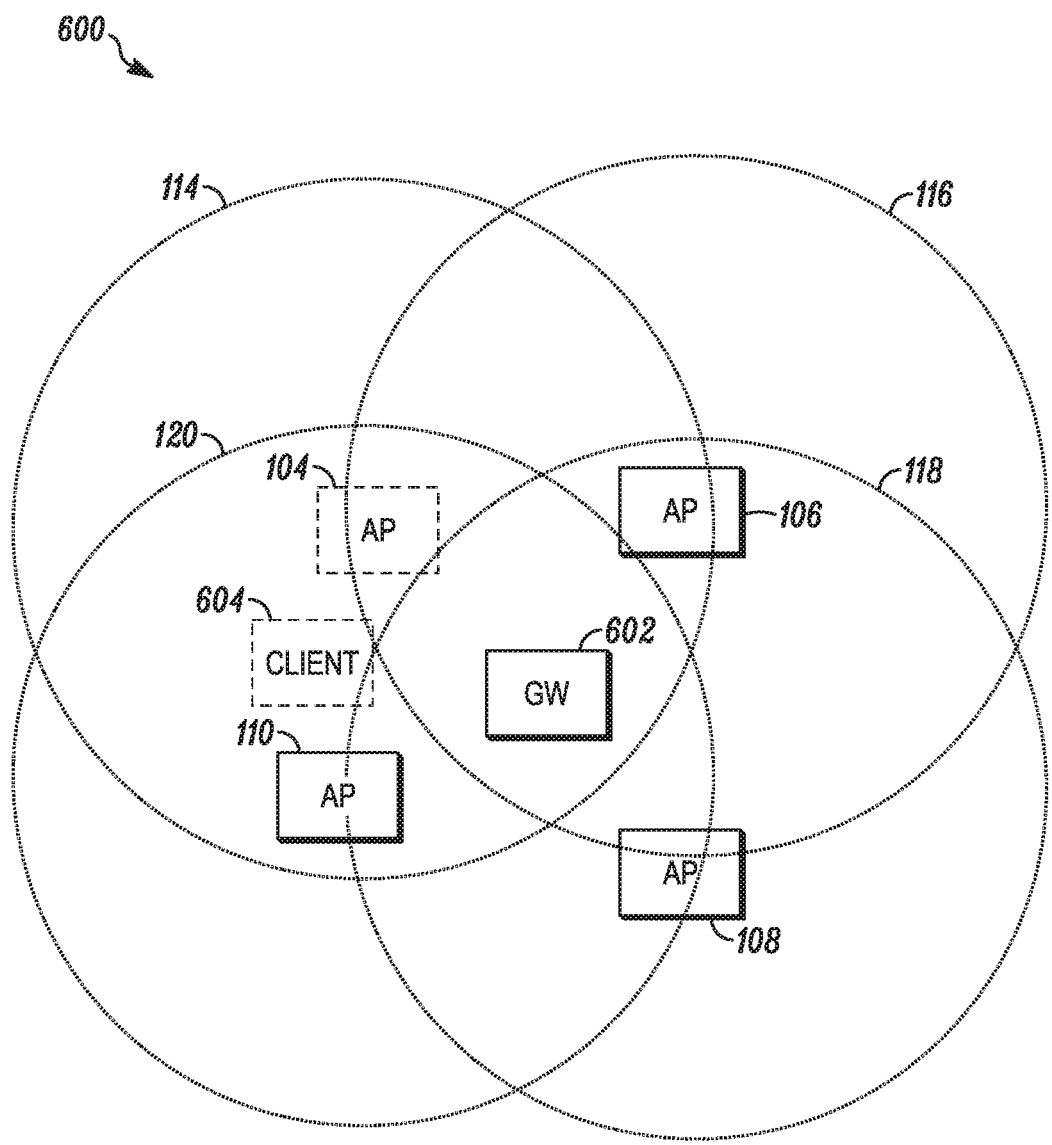
FIG. 15 illustrates the LAN of FIG. 6 at a time $t_{11}$, in accordance with aspects of the present disclosure.

FIG. 15 illustrates LAN 600 at a time $t_{11}$, wherein client 604 has been steered to AP 104.

As shown in the figure, at time $t_{11}$, client 604 is connected to AP 104, as indicated by the dotted lines of client 604 and AP 104.

As discussed above, LAN 600 does not configure the APs in either the first approach or the second approach as discussed above with reference to FIGS. 3A-B. As such, the time to send steering instruction 1402 is relatively short, thus increasing the likelihood that AP 104 remains the best AP for client 604. Further, all the APs will have responded with a NAC report, thus increasing the likelihood that AP 104 is the best choice of all the APs.

In the above example LAN 600, there is only a single client, which is client 604. It should be noted however, that in other applications in accordance with the present disclosure, multiple clients may be monitored for steering in in order to optimize network resources. Accordingly, each monitored client may be optimally steered in a manner similar to that as discussed above with reference to client 604.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A gateway for use with a client device and a number of access points (n access points), the client device being operable to communicate with a number of access points (m access points), wherein 1≤m≤n, wherein each of the n access points being operable to communicate with the gateway, wherein the client device being further operable to transmit a probe request to the m access points, and wherein each of the n access points being further operable to transmit a respective non-associated client (NAC) report, the gateway comprising:
  a data communication component operable to communicate with each of the n access points; and
  an access point/client (AP/C) management component operable to generate a NAC report request, to generate an issue request, and to generate a steering instruction,
  wherein the issue request includes information that identifies a plurality of p channels for which the client device should transmit the probe request for the respective m access points,
  wherein the data communication component is further operable to transmit the NAC report request to a respective access point of the n access points,
  wherein the data communication component is further operable to transmit the issue request to the client device, and wherein the issue request at least instructs the client device to transmit the probe request,
  wherein the AP/C management component is operable to generate the steering instruction based on the respective NAC report of each of the n access points and to transmit the steering instruction to the client device, and
  wherein the data communication component is further operable to transmit the steering instruction to the client device.

2. The gateway of claim 1,
  wherein the data communication component is operable to communicate with each of the n access points over n respective channels of the plurality p channels,
  wherein 1≤n≤p, and
  wherein the AP/C management component is operable to generate the issue request so as to include information identifying the n channels so as to instruct the client device as to a respective channel of the n respective channels to transmit the NAC report request to the respective access point of the n access points.

3. The gateway of claim 2, wherein the data communication component is operable to communicate with each of the n access points using an IEEE 802.11 protocol.

4. The gateway of claim 3, wherein the data communication component is further operable to transmit the issue request to the client device using an IEEE 802.11 protocol.

5. The gateway of claim 1, wherein the data communication component is operable to communicate with each of the n access points using an IEEE 802.11 protocol.

6. The gateway of claim 5, wherein the data communication component is further operable to transmit the issue request to the client device using an IEEE 802.11 protocol.

7. The gateway of claim 1, wherein the data communication component is further operable to transmit the issue request to the client device using an IEEE 802.11 protocol.

8. A method comprising:
  transmitting, from a gateway and to a number of access points (n access points), a non-associated client (NAC) report request;
  transmitting, from the gateway and to one of the n access points in communication with a client device, an issue request, wherein the issue request includes information that identifies a plurality of p channels for which the client device should transmit the probe request for the respective m access points;
  transmitting, from the one of the n access points and to the client device, the issue request;
  transmitting, from the client device and to a number of access points (m access points), an issue probe request based on the issue request;
  transmitting, from a respective access point of the n access points and to the gateway, a respective non-associated client (NAC) report;
  transmitting, from the gateway and to the one of the n access points in communication with the client device, a steering instruction for the client device; and
  transmitting, from the one of the n access points in communication with the client device and to the client device, the steering instruction,
  wherein 1≤m≤n.

9. The method of claim 8,
  wherein the gateway comprises a data communication component that is operable to communicate with each of the n access points over n respective channels of the plurality p channels,
  wherein 1<n≤p, and
  wherein the gateway comprises an AP/C management component that is operable to generate the issue request so as to include information identifying the n channels so as to instruct the client device as to a respective channel of the n respective channels to transmit the NAC report request to the respective access point of the n access points.

10. The method of claim 9, wherein the data communication component is operable to communicate with each of the n access points using an IEEE 802.11 protocol.

11. The method of claim 10, wherein the data communication component is further operable to transmit the issue request to the client device using an IEEE 802.11 protocol.

12. The method of claim 8, wherein the gateway comprises a data communication component that is operable to communicate with each of the n access points using an IEEE 802.11 protocol.

13. The method of claim 12, wherein the data communication component is further operable to transmit the issue request to the client device using an IEEE 802.11 protocol.

14. The method of claim 8, wherein the gateway comprises a data communication component that is further operable to transmit the issue request to the client device using an IEEE 802.11 protocol.

15. A non-transitory computer-readable storage medium for use in conjunction with a computer, the computer-readable storage medium storing program instructions, wherein, when executed by the computer, the program instructions cause the computer to perform operations comprising:
   transmitting, from a gateway and to a number of access points (n access points), a non-associated client (NAC) report request;
   transmitting, from the gateway and to one of the n access points in communication with a client device, an issue request, wherein the issue request includes information that identifies a plurality of p channels for which the client device should transmit the probe request for the respective m access points;
   transmitting, from the one of the n access points and to the client device, the issue request;
   transmitting, from the client device and to a number of access points (m access points), an issue probe request based on the issue request;
   transmitting, from a respective access point of the n access points and to the gateway, a respective non-associated client (NAC) report;
   transmitting, from the gateway and to the one of the n access points in communication with the client device, a steering instruction; and
   transmitting, from the one of the n access points in communication with the client device and to the client device, the steering instruction for the client device,
   wherein $1 \leq m \leq n$.

16. The non-transitory computer-readable storage medium of claim 15,
   wherein the gateway comprises a data communication component that is operable to communicate with each of the n access points over n respective channels of the plurality p channels,
   wherein $1 < n \leq p$, and
   wherein the gateway comprises an AP/C management component that is operable to generate the issue request so as to include information identifying the n channels so as to instruct the client device as to a respective channel of the n respective channels to transmit the NAC report request to the respective access point of the n access points.

17. The non-transitory computer-readable storage medium of claim 16,
   wherein the data communication component is further operable to communicate with each of the n access points using an IEEE 802.11 protocol.

18. The non-transitory computer-readable storage medium of claim 17,
   wherein the data communication component is further operable to transmit the issue request to the client device using an IEEE 802.11 protocol.

19. The non-transitory computer-readable storage medium of claim 15,
   wherein the gateway comprises a data communication component that is operable to communicate with each of the n access points using an IEEE 802.11 protocol.

20. The non-transitory computer-readable storage medium of claim 19,
   wherein the data communication component is further operable to transmit the issue request to the client device using an IEEE 802.11 protocol.

* * * * *